United States Patent
Shilton et al.

[15] 3,635,460
[45] Jan. 18, 1972

[54] VEHICLE SUSPENSION LEVELLING VALVES

[72] Inventors: Brian R. Shilton; Donald J. Byron, both of Lincoln, England

[73] Assignee: Clayton Dewandre Company Limited

[22] Filed: Aug. 18, 1969

[21] Appl. No.: 851,029

[30] Foreign Application Priority Data

Aug. 21, 1968 Great Britain..................40,007/68

[52] U.S. Cl. ..................267/65 D, 137/627.5, 280/124 F
[51] Int. Cl. ......................................................B60g 17/04
[58] Field of Search..................267/65, 65 D, 64, 65 R, 65 P; 137/627.5; 280/124 F

[56] References Cited

UNITED STATES PATENTS 3,007,496  11/1961  Heiss....................................267/65 D
3,073,619  1/1963  Manning..............................267/65 D Primary Examiner—James B. Marbert
Attorney—Strauch, Nolan, Neale, Nies & Kurz

[57] ABSTRACT

A levelling valve for use in a vehicle suspension system, said valve comprising a lever adapted to be connected at one end to the vehicle axle or to a suspension member and pivotally mounted at the other end on the body of said valve, a shaft rotatable in response to movement by said lever, an operating member connected to said shaft and adapted to act on a piston in response to rotational movement of said shaft, said piston being provided with a groove or slot in which the operating member is received, a cylinder filled with damping fluid and housing said piston, and a valve spindle movable in response to movement of said piston to connect one or more suspension units of the vehicle to a source of fluid pressure or to exhaust depending on the direction of movement of the spindle and hence the lever, wherein the piston is normally located in central position in the cylinder and is movable towards one end or other of the cylinder when the lever moves, the movement of the piston towards the ends of the cylinder being damped and means being provided to allow undamped return of the piston to the central position in the cylinder.

7 Claims, 5 Drawing Figures

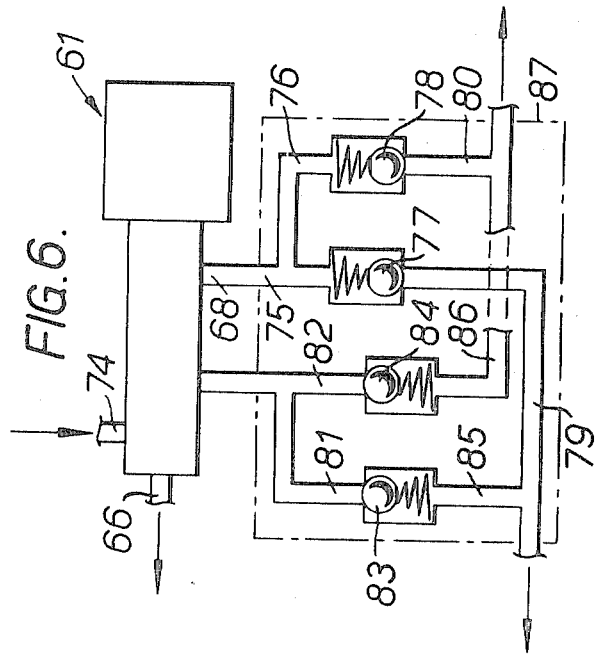
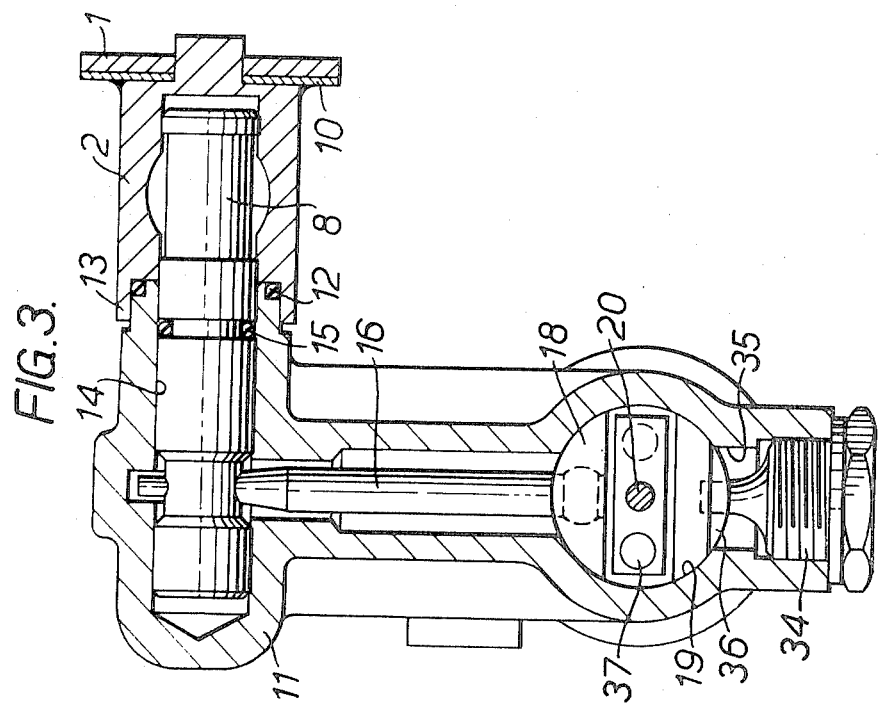

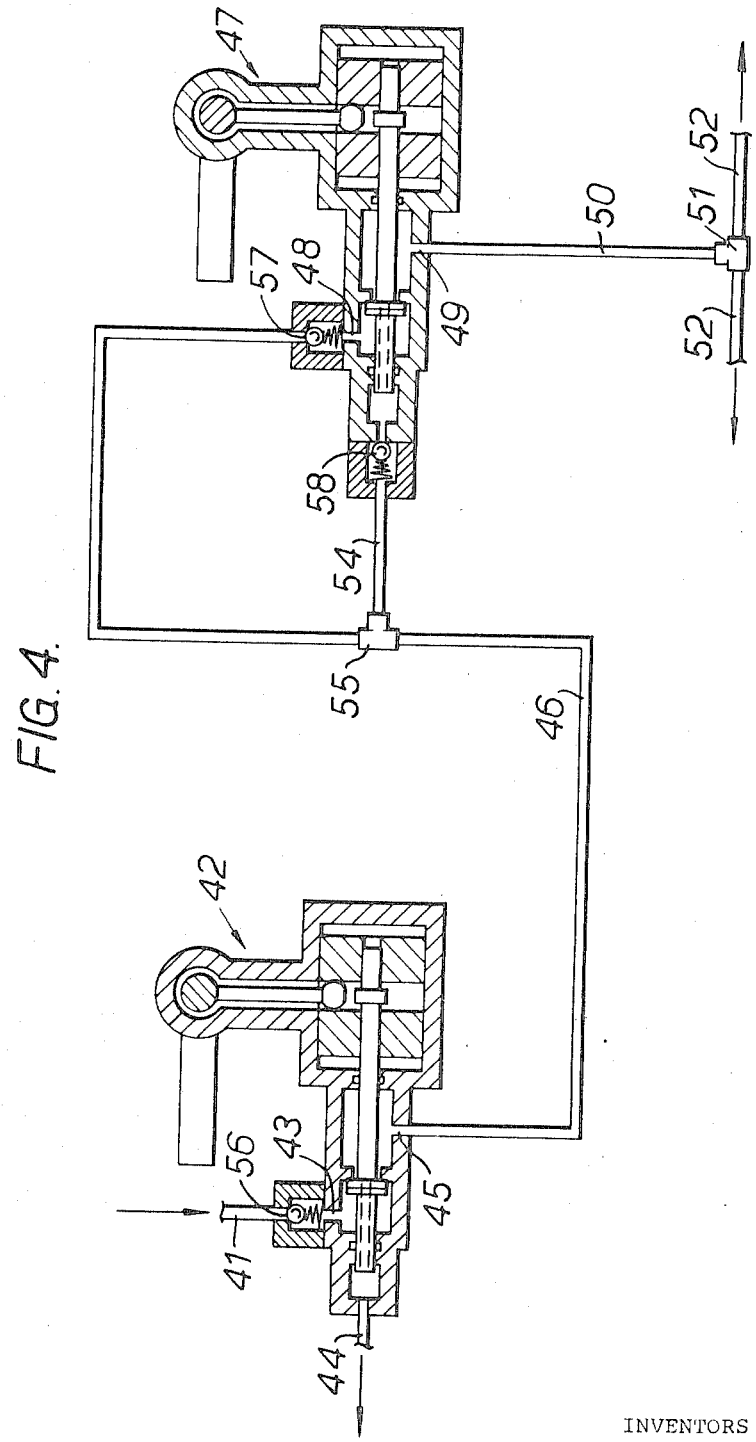

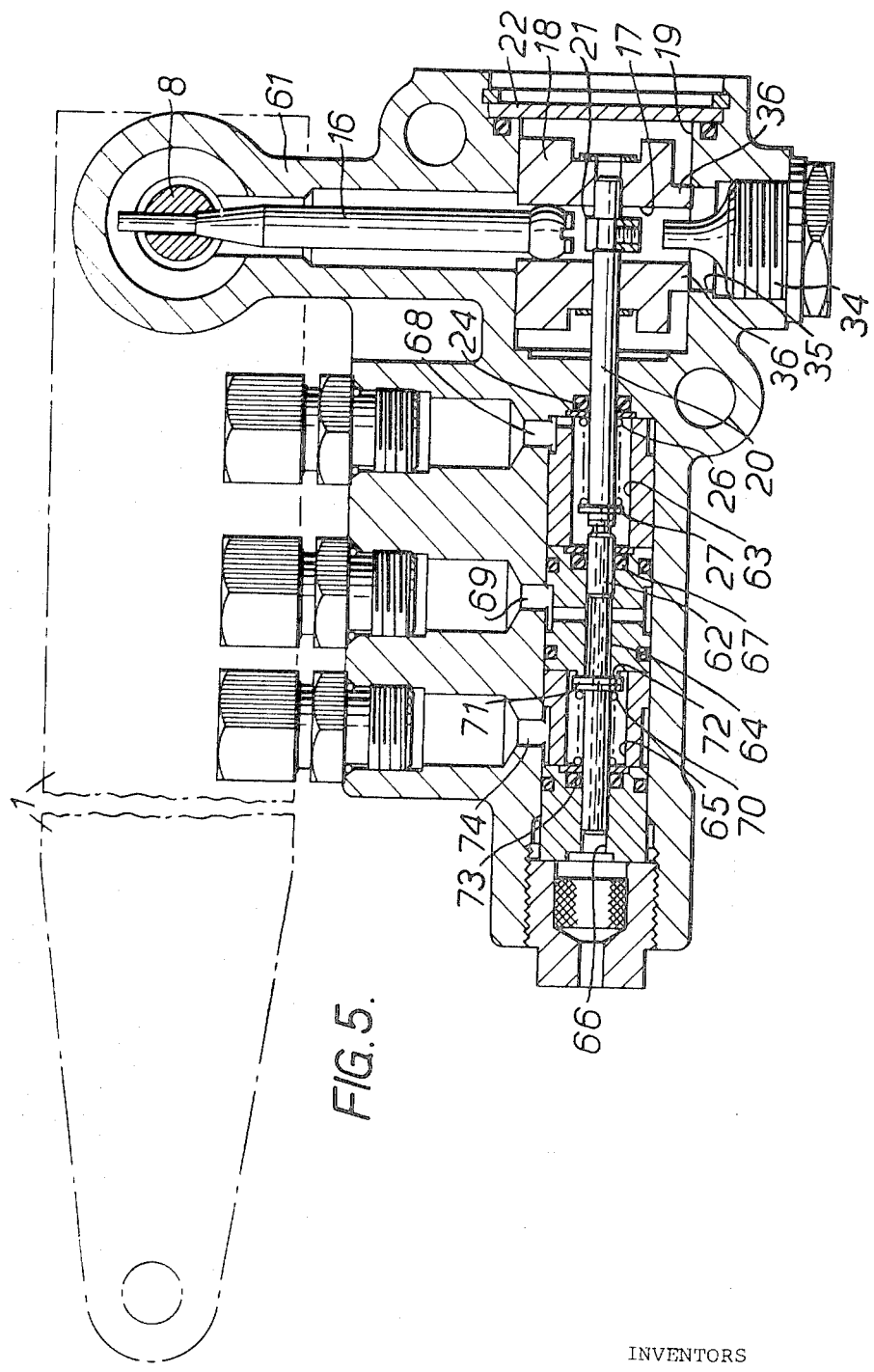

VEHICLE SUSPENSION LEVELLING VALVES

This invention relates to levelling valves for use in vehicle suspension systems.

The invention aims to provide a levelling valve for use in a pneumatic or hydraulic suspension system for a vehicle, which is operated automatically in response to changes in loading of the vehicle to admit or exhaust fluid to or from one or more suspension units so as to maintain the vehicle body at a predetermined level with respect to the axles.

According to the invention, there is provided a levelling valve for use in a vehicle suspension system, said valve comprising a lever adapted to be connected at one end to the vehicle axle or to a suspension member and pivotally mounted at the other end on the body of said valve, a shaft rotatable in response to movement by said lever, an operating member connected to said shaft and adapted to act on a piston in response to rotational movement of said shaft, said piston being provided with a groove or slot in which the operating member is received, a cylinder filled with damping fluid and housing said piston, and a valve spindle movable in response to movement of said piston to connect one or more suspension units of the vehicle to a source of fluid pressure or to exhaust depending on the direction of movement of the spindle and hence the lever, wherein the piston is normally located in a central position in the cylinder and is movable towards one end or other of the cylinder when the lever moves, the movement of the piston towards the ends of the cylinder being damped and means being provided to allow undamped return of the piston to the central position in the cylinder.

Preferably, the lever is secured to a casing which is rotatably mounted on the valve body. The rotatable shaft extends through the valve body into the casing and a plunger mounted in the casing is arranged to act on the shaft to rotate the same in response to rotational movement of the lever and casing. The plunger is desirably spring-loaded and is arranged to bear against a flat on the shaft. The "flat" may, if desired, have a slightly concave profile.

The piston is preferably provided with a bore to receive the valve spindle and the spindle may have a collar secured thereon which is acted on by the sides of the slot or groove in the piston when said piston is moved from the central position in the cylinder.

The present invention also extends to vehicle suspension systems employing one or more levelling valves according to this invention.

The invention will now be further described, by way of example, with reference to the accompanying drawings, in which:

FIG. 3 is a section on line III—III in FIG. 2;

FIG. 4 shows, diagrammatically, a suspension arrangement for a vehicle employing two of the valves illustrated in FIGS. 1 to 3;

FIG. 5 is a section through a modified form of the levelling valve illustrated in FIGS. 1 to 3; and FIG. 6 illustrates, diagrammatically, fluid connections between the valve shown in FIG. 5 and vehicle suspension units.

Figure 1:
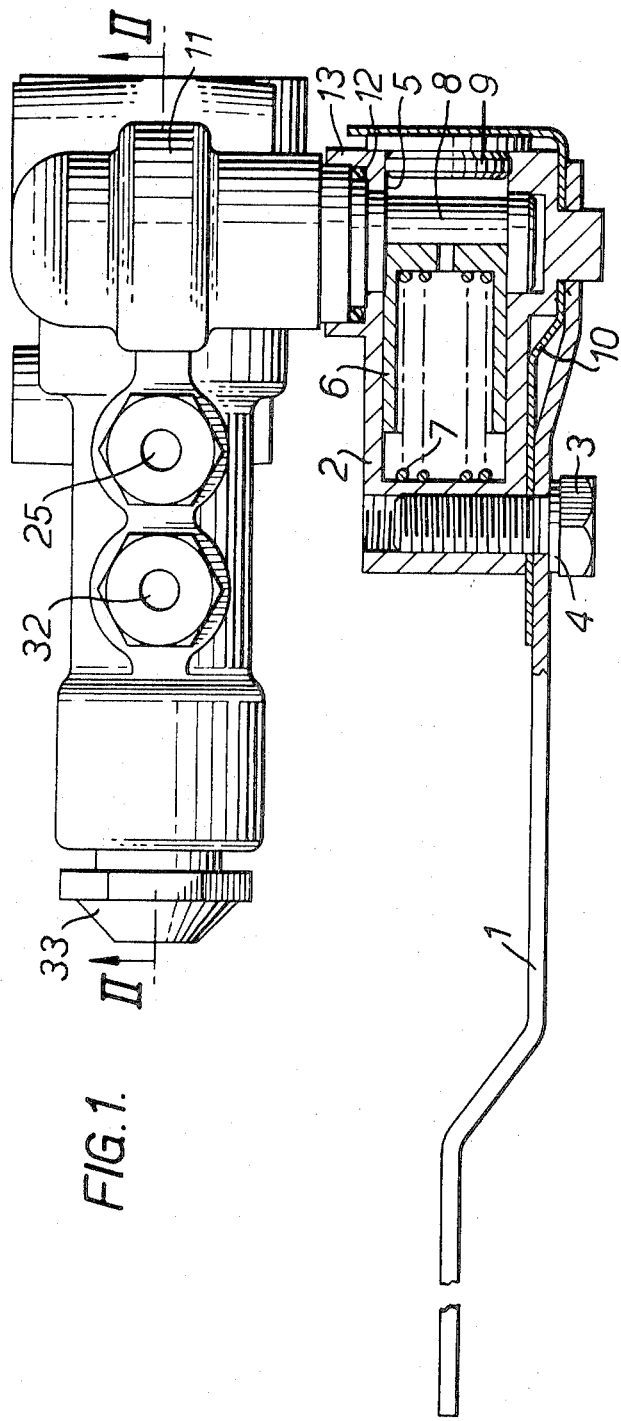
FIG. 1 is a plan view of one embodiment of a levelling valve according to the present invention.
Figure 2:
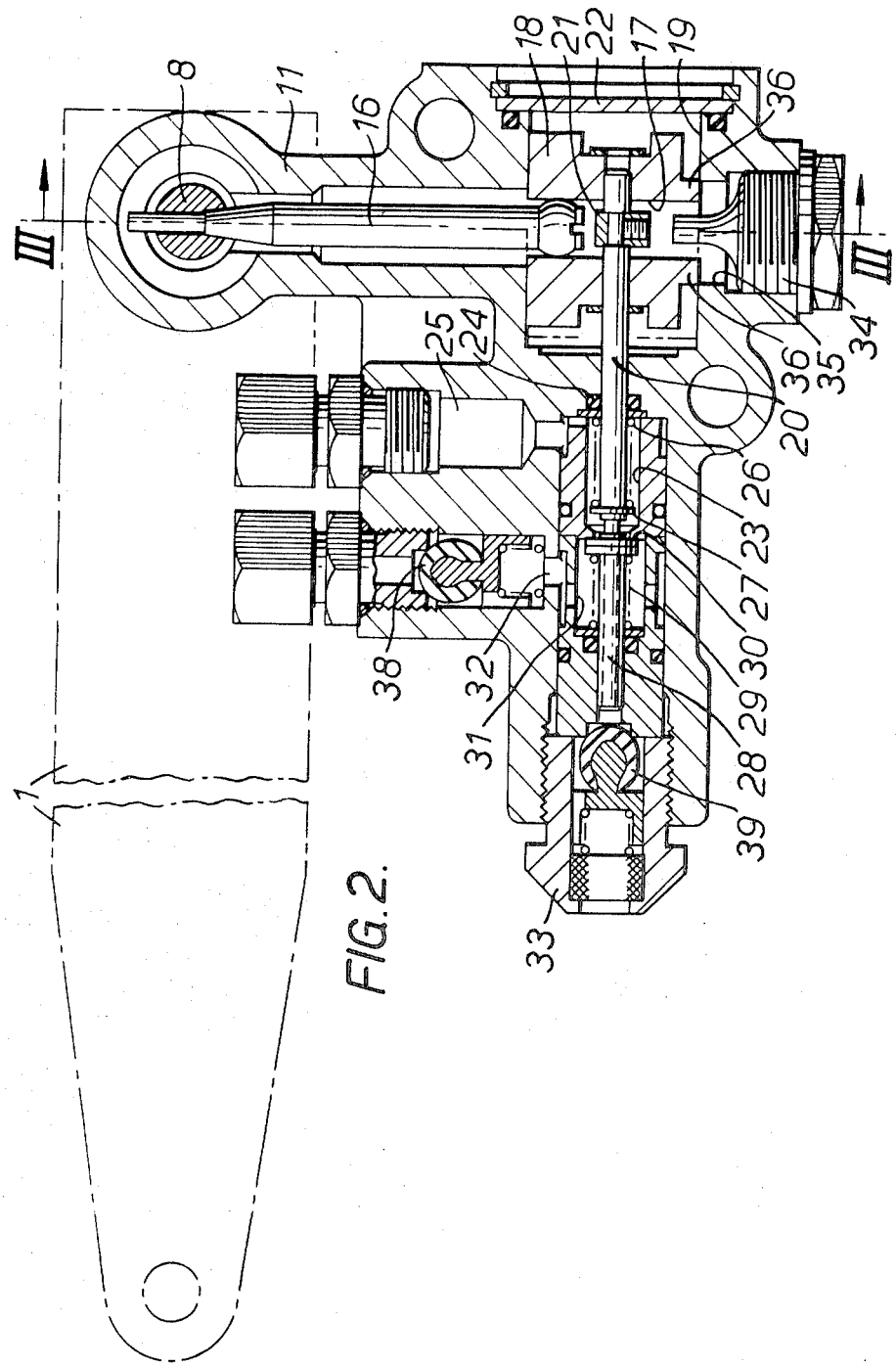
FIG. 2 is a section on line II—II in FIG. 1.

Reference will first be made to FIGS. 1 to 3 of the accompanying drawings in which the levelling valve comprises a lever 1 which is secured to a casing 2 by a bolt 3 and spring washer 4. The casing has a chamber 5 which houses a plunger 6 which is urged by a spring 7 against a flat on a shaft 8. The spring 7 bears against one end of the chamber 5 and the other end of the chamber is closed by a plug 9 which is held in position by a spring clip 10. The clip 10 is clamped to the casing 2 by the lever 1 and bolt 3 as shown in FIG. 1.

The casing 2 is rotatably mounted on a valve body 11, a seal 12 being provided between the valve body and a sleeve 13 formed on the casing 2. The shaft 8 extends into a bore 14 in the valve body 1 and is rotatable with respect thereto. A seal 15 is provided between the bore 14 and shaft 8 is located in a groove in said shaft as shown in FIG. 3.

A valve-operating member 16 is secured at one end to the shaft 8 and extends radially from said shaft. The other end of the member 16 is received in a groove or slot 17 provided in a piston 18. The piston is located in a cylinder 19 in the valve body 11 and is provided with a through-going bore for the reception of a valve spindle 20. The spindle has a collar 21 secured thereon in the region of the groove or slot 17 whereby the collar can be acted on by both sides of said groove or slot. When, however, the piston 18 is centrally located in the cylinder 19 there is a clearance between the collar and the piston. The cylinder 19 is closed at one end by a seal 22 and the spindle 20 passes through a bore provided in the other end of the cylinder 19 into a chamber 23. The cylinder is filled with liquid to provide a damping action on piston movement and a seal 24 is provided on the spindle 20 in chamber 23 to prevent liquid escaping from the cylinder and to prevent suspension fluid from entering the cylinder as hereinafter described.

The chamber 23 is provided with a port 25 adapted to be connected by a suitable fluid line to one or more vehicle suspension units (not shown). The spindle 20 is urged by a spring 26 acting on a collar 27 on the spindle against the head of a hollow valve member 28 which is urged by a second spring 29, which is slightly stronger than the spring 26, against a valve seat 30. The valve member 28 is located in a second chamber 31 which is connected via a port 32 and a suitable fluid line to a source of pressure fluid (not shown) and the bore in the hollow valve member leads to an exhaust port 33.

When the levelling valve above described is mounted on a vehicle, movement of the vehicle body due to an increase or decrease in load causes the lever 1 and casing 2 to pivot on the valve body 11. The plunger 6 pivots with the casing 2 and acts on the shaft 8 to apply a torque thereto. The plunger 6 is effective to cause the shaft 8 to rotate which, via the operating member 16, moves the piston 18 towards one or other end of the cylinder 19. The liquid at the end of the cylinder to which the piston is moved can only escape to the other end of the cylinder through the slight clearance between the walls of the cylinder and piston. The piston 18 therefore moves slowly into contact with the collar 21 and thereafter moves the spindle 20 to connect one or more of the vehicle suspension units to the pressure fluid source or to exhaust depending on the direction of movement of the piston. Fluid is thus passed to or from the suspension unit(s) and the vehicle body is raised or lowered.

When the piston 81 is moved to the left as viewed in FIG. 2, the spindle 20 forces the valve member 28 off valve seat 30 and enables pressure fluid supplied to the port 32 from the pressure fluid source to pass through chambers 31, 23 and port 25 to the suspension unit(s). Movement of the piston 18 towards the right as viewed in FIG. 2 is effective to lift the spindle clear of valve member 28 whereby pressure fluid in the suspension unit(s) can escape to exhaust via port 25, chamber 23, the bore in valve member 28 and exhaust port 33.

It will be seen that there is a time delay between movement of the lever or operating arm and the appropriate levelling of the vehicle. This delay prevents small spurts of fluid from being passed to and from the suspension units when the wheels of the vehicle move up and down on bumpy or undulating roads and also prevents the levelling valve or valves from correcting a vehicle pitch attitude during braking or acceleration. The delay is desirably arranged to be between 10 and 20 seconds.

The cylinder 19 is desirably provided with a removable plug 34 for filling and emptying damping liquid. The plug 34 seals a port 35 leading from the cylinder wall and the piston 18 has a pair of lands 36 which cut off this port from both ends of the cylinder when the piston is in its central position. However, when the piston 18 is moved towards one end of the cylinder 19, the other end of the cylinder is in communication with the port 35. The piston 18 is provided at each end with a non-return valve, one of which, 37 is shown in FIG. 3. The non-return valves may be of the flap type. When the vehicle body attains the desired level, the lever 1 is operative to rotate the shaft 8 which returns the piston 18 from one end to the central position in the cylinder 19. As the piston 18 moves from said one end of the cylinder, the liquid at the other end is forced into the port 35 and thence through one of the nonreturn valves to said one end of the cylinder. The piston is thus rapidly returned to its central position closing the valve and thus preventing any overshooting of the desired body level when levelling and any consequent hunting.

Nonreturn or check valves may be incorporated in fluid pressure inlet port 32 and exhaust port 33 on the valve body 11 or in pipes leading to these ports. The valve 38 in the supply line serves to prevent fluid from leaking back from the suspension unit(s) should the reservoir supply pressure drop for any reason and the valve 39 in the exhaust line ensures that a small minimum pressure remains in the suspension unit(s) to prevent damage thereto.

The above described embodiment of the levelling valve according to the invention should desirably be mounted on the body or chassis of a vehicle with the operating arm or lever 1 connected to the center of the axle or antiroll bar so that no correction is made for vehicle roll on long bends. This arrangement may be physically impossible on some vehicles in which case two such valves are desirable used connected as shown in FIG. 4 of the drawings. In this arrangement, pressure fluid is led from a pressure fluid source (not shown) via fluid line 41 to a port 43 of a first levelling valve 42. The valve 42 has an outlet port 45 and an exhaust port 44. The outlet port 45 is connected by a fluid line 46 to an inlet port 48 of a second levelling valve 47. The valve 47 has an outlet port 49 which leads via a fluid line 50, T-piece 51 and branch lines 52 to two suspension units (not shown) which are mounted on the vehicle. The valve 47 also has an exhaust port 53 connected by a fluid line 54 and T-piece 55 to the fluid line 46. The ports 43, 48 and 53 are provided respectively with spring-loaded nonreturn valves 56, 57 and 58.

With this arrangement, fluid can only be supplied to or exhausted from the suspension units when both of the valves are open, i.e., when the levers or operating arms of both valves are raised or lowered together. The levelling valves may control the front suspension units, the rear units, or both front and rear units of a vehicle.

The above described arrangements allow a side-to-side transfer of fluid from one suspension unit to the other on the same vehicle axle. However in some cases it may be necessary to avoid this in which case the modified form of levelling valve illustrated in FIG. 5 is used. In FIG. 5, components which correspond to the same components illustrated in FIGS. 1 to 3 are denoted by the same reference numerals. The valve body of the valve shown in FIG. 5 is denoted by the reference numeral 61 and the valve spindle 20 of this valve is urged by its spring 26 which is located in a first chamber 63 against the head of a hollow valve member 62. The valve member 62 extends from the first chamber 63, through a second chamber 64 and a third chamber 65 into an exhaust port 66. A seal 67 is provided to prevent the escape of fluid from the chamber 63 via the bore receiving the valve member and the chamber 63 is provided with an open port 68. A port 69 extends from the second chamber 64. A spring 70 acts on a collar 71 provided on the valve member 62 to urge the collar against a valve seat 72 provided in the third chamber and also to urge the head of valve member 62 against the valve spindle 20. The spring 70 is slightly stronger than the spring 26. A seal 73 is provided to prevent the escape of pressure fluid from the third chamber 65 to the exhaust port 66 and the third chamber is provided with an open port 74. The ports 68 and 69 are connected by fluid lines to the suspension units of a vehicle and the port 74 is connected by a fluid line to a source of pressure fluid (not shown).

FIG. 6 shows diagrammatically the connection of the ports 68 and 69 to the suspension units. As shown, the port 68 is connected by fluid lines 75 and 76 to nonreturn valves 77 and 78 which permit flow of pressure fluid only from the suspension units (not shown) to the port 68 via fluid lines 79 and 80, valves 77 and 78 and fluid lines 75 and 76. The port 69 is connected by fluid lines 81 and 82 to nonreturn valves 83 and 84 which permit flow of pressure fluid only from the port 69 to the suspension units via fluid lines 81 and 82, valves 83 and 84 and fluid lines 85 and 86 which are connected respectively to the fluid lines 79 and 80. If desired the valves and fluid line connections may be mounted in a casing 87 which is shown in chain-dotted lines in FIG. 6.

Movement of the lever or operating arm 1 in a direction to move the valve spindle 20 away from the valve member 62 results in the first chamber 63 being in communication with the exhaust port 66 through the bore in the hollow valve member 62. Pressure fluid can therefore pass from the suspension units via fluid lines 79 and 80 spring-loaded nonreturn valves 77 and 78, fluid lines 75 and 76 and port 68 through the first chamber 63 to exhaust. Movement of the lever or operating arm 1 in the opposite direction is effective to cause the valve spindle 20 to act on the valve member 62 to lift the collar 71 on said member clear of its seating 72 and thereby allow fluid communication between the third and second chambers 65 and 64. Fluid is therefore supplied from the pressure fluid source to the suspension units via the third chamber 65, the second chamber 64, port 69, fluid lines 81 and 82, spring-loaded nonreturn valves 83 and 84 and fluid lines 85, 79 and 86, 80.

Such a levelling valve is preferably mounted on a vehicle with the lever or operating arm 1 connected to the center of the axle or antiroll bar and is connected by fluid lines to all of the suspension units on the axle. The nonreturn valves may be provided in each of the lines leading to the units or alternatively in the ports on the valve body 61.

In some cases it may be necessary to avoid lateral transfer of fluid between the suspension units on a vehicle where a single centrally mounted levelling valve cannot be accommodated. In this case, it is not sufficient to have a separate levelling valve and suspension unit at each side of the axle as correction for vehicle roll would then take place. The problem can be solved by connecting the support port 74 and exhaust port 66 of the modified form of levelling valve according to this invention respectively to the ports 69 and 68 of another of said modified form of levelling valve or to the single delivery port 25 of the first-mentioned embodiment of the levelling valve according to the invention. Pressure fluid can then be transferred to or from the suspension units only when both of the levelling valves are open.

The suspension units to which the levelling valve or valves is or are connected desirably take the form of air springs. However fluid other than compressed air may be used if desired.

We claim:

1. A levelling valve for use in a vehicle suspension system, said valve comprising a lever adapted to be connected at one end to the vehicle suspension system and secured at the other end on the body of said valve to a casing which is rotatably mounted on the body of said valve, a shaft extending through the valve body into the casing, a plunger mounted in said casing arranged to act on said shaft to rate the same in response to rotational movement of the lever and casing, said shaft being formed with a flat and a spring being provide to urge said plunger against the flat on the shaft, an operating member connected to said shaft, a piston having a groove or slot to receive said operating member whereby said piston is moved in response to rotational movement of said shaft, a cylinder filled with damping fluid and housing said piston, and a valve spindle movable in response to movement of the piston to connect one or more suspension units of the vehicle to a source of fluid pressure or to exhaust depending on the direction of movement of the spindle and hence the lever, said piston normally being located in a central position in the cylinder and being movable towards one end or other of the cylinder when the lever moves, the movement of the piston towards the ends of the cylinder being damped and means being provided to allow undamped return of the piston to the central position in the cylinder.

2. A levelling valve as claimed in claim 1, wherein the "flat" has a slightly concave profile.

3. A levelling valve as claimed in claim 1, wherein the piston is provided with a bore to receive the valve spindle and said spindle has a collar secured thereon which is arranged to be acted on by the sides of the groove or slot in the piston when said piston is moved from the central position in the cylinder.

4. A levelling valve as claimed in claim 1, wherein the valve spindle is arranged to engage the head of a hollow valve member when the piston is in the central position in the cylinder, movement of the piston towards one end of the cylinder being effective to lift the spindle clear of the valve member and allow fluid to pass from the suspension unit(s) through the valve member to exhaust.

5. A levelling valve as claimed in claim 4, wherein the valve member is provided with a collar and a valve spring which is normally effective to force the collar against a valve seat, movement of the piston towards the other end of the cylinder being effective to force the spindle to act on the valve member and lift the collar clear of the valve seat to permit fluid to pass to the suspension unit(s).

6. A levelling valve assembly fir a vehicle having a source of fluid under pressure and a suspension system having one or more fluid-pressure-responsive suspension units, said valve assembly comprising a body having a cylinder filled with damping fluid and containing a normally centrally located piston, a shaft rotatably mounted in said valve body and connected to oppositely displace said piston when rotated in opposite directions, a lever adapted to be connected to a load-responsive part in said vehicle and connected to said shaft whereby a change in vehicle load is effective to rock said shaft about its longitudinal axis to displace said piston in one direction or the other, piston movement toward the ends of the cylinder being damped by said fluid and means being provided whereby return movement of the piston to central position in the cylinder is undamped, means providing a first fluid passage through said body having an intermediate valve seat and opposite ends connected to said pressure source and at least one of said suspension units, means defining a second passage in said body having its outer end terminating in an exhaust port and its inner end adjacent said seat, a valve element spring-biased onto said seat constructed and arranged to normally close both of said passages and a spindle operatively connected between said piston and said valve element whereby displacement of the piston in one direction is effective to unseat said valve element to connect said suspension unit in fluid-pressure communication with said source while maintaining said second passage closed, and displacement of said piston in the other direction is effective to open said second passage to establish fluid communication between said suspension unit and exhaust while maintaining said first passage closed against fluid-pressure communication between said source and both said suspension unit and exhaust.

7. The levelling valve assembly defined in claim 6, wherein said valve element is a hollow member having a through bore open at one end to exhaust and having its other end in end abutment with and closed by said spindle when piston is either in its central position or displaced in said one direction and opened by axial separation of said spindle and hollow member when said piston is displaced in said other direction.

* * * * *

UNITED STATES PATENT OFFICE
CERTIFICATE OF CORRECTION

Patent No. 3,635,460  Dated January 18, 1972

Inventor(s) Brian R. Shilton et al.

It is certified that error appears in the above-identified patent and that said Letters Patent are hereby corrected as shown below:

Column 1, line 74, after "8" insert -- and --. Column 2, line 45, "81" should read -- 18 --. Column 4, claim 1, line 55, "rate" should read -- rotate --; line 57, "provide" should read -- provided --. Column 5, claim 6, line 20, "fir" should read -- for --.

Signed and sealed this 4th day of July 1972.

(SEAL)
Attest:

EDWARD M. FLETCHER, JR.
Attesting Officer

ROBERT GOTTSCHALK
Commissioner of Patents